United States Patent
Zhou et al.

(10) Patent No.: US 9,451,439 B2
(45) Date of Patent: Sep. 20, 2016

(54) DEVICE DISCOVERY METHOD, DEVICE, AND SYSTEM

(71) Applicant: Huawei Technologies Co., Ltd., Shenzhen (CN)

(72) Inventors: Weihua Zhou, Shenzhen (CN); Xiaobo Wu, Shanghai (CN); Yali Guo, Shenzhen (CN); Wanqiang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/511,417

(22) Filed: Oct. 10, 2014

(65) Prior Publication Data
US 2015/0024745 A1 Jan. 22, 2015

Related U.S. Application Data

(63) Continuation of application No. PCT/CN2012/074021, filed on Apr. 13, 2012.

(51) Int. Cl.
| | |
|---|---|
| *H04W 4/00* | (2009.01) |
| *H04W 8/00* | (2009.01) |
| *H04W 48/10* | (2009.01) |
| *H04W 48/16* | (2009.01) |
| *H04W 76/02* | (2009.01) |
| *H04W 64/00* | (2009.01) |

(52) U.S. Cl.
CPC ............. *H04W 8/005* (2013.01); *H04W 48/10* (2013.01); *H04W 48/16* (2013.01); *H04W 64/00* (2013.01); *H04W 76/023* (2013.01)

(58) Field of Classification Search
CPC ..................................................... H04W 8/005

USPC ......................................................... 455/434
See application file for complete search history.

(56) References Cited

U.S. PATENT DOCUMENTS

| | | | |
|---|---|---|---|
| 8,090,616 B2 | 1/2012 | Proctor, Jr. et al. | |
| 2006/0079245 A1 | 4/2006 | Moed | |
| 2006/0160544 A1* | 7/2006 | Sun | H04W 8/18 455/456.1 |
| 2009/0327391 A1* | 12/2009 | Park | H04W 8/005 709/201 |
| 2010/0061294 A1 | 3/2010 | Proctor, Jr. et al. | |
| 2010/0254308 A1 | 10/2010 | Laroia et al. | |

(Continued)

FOREIGN PATENT DOCUMENTS

| | | |
|---|---|---|
| CN | 101171875 A | 4/2008 |
| CN | 101388782 A | 3/2009 |

(Continued)

*Primary Examiner* — Sam K Ahn
*Assistant Examiner* — Fabricio R Murillo Garcia
(74) *Attorney, Agent, or Firm* — Slater Matsil, LLP

(57) ABSTRACT

A device discovery method includes: enabling, by a first device, a device-to-device monitoring and broadcasting function; after the first device detects broadcast information of a second device, reporting the broadcast information of the second device and a user identifier of a target user to a network side, requesting that the network side obtains, according to the broadcast information of the second device, an identifier of a user that logs in to the second device, and determines whether the identifier of the user that logs in to the second device is the user identifier of the target user; and receiving a result of the determining returned by the network side, and confirming, by the first device according to the result of the determining, whether a device to which the target user logs in falls within a preset distance from the first device.

20 Claims, 11 Drawing Sheets

(56) References Cited

U.S. PATENT DOCUMENTS

| | | |
|---|---|---|
| 2010/0279611 A1 | 11/2010 | Kumazawa |
| 2011/0083111 A1 | 4/2011 | Forutanpour et al. |
| 2011/0098043 A1 | 4/2011 | Yu et al. |
| 2011/0182280 A1 | 7/2011 | Charbit et al. |
| 2011/0258313 A1* | 10/2011 | Mallik ............... H04W 8/005 709/224 |
| 2011/0276412 A1* | 11/2011 | Mgrdechian ....... G06Q 30/0207 705/14.66 |
| 2012/0079019 A1* | 3/2012 | Miettinen ............. G06Q 50/00 709/204 |

FOREIGN PATENT DOCUMENTS

| | | |
|---|---|---|
| CN | 102165840 A | 8/2011 |
| JP | 2008541531 A | 11/2008 |
| JP | 2009164749 A | 7/2009 |
| JP | 2010141578 A | 6/2010 |
| WO | 2010035100 A1 | 4/2010 |

\* cited by examiner

DEVICE DISCOVERY METHOD, DEVICE, AND SYSTEM

This application is a continuation of International Application No. PCT/CN2012/074021, filed on Apr. 13, 2012, which is hereby incorporated by reference in its entirety.

TECHNICAL FIELD

The present invention relates to the field of communication technologies, and in particular, to a device discovery method, device, and system.

BACKGROUND

With the widespread use of social applications, a function of short-distance discovery becomes more important. Users want to learn, in a timely manner, that a friend appears around or leaves, so as to further establish short-distance communication with their friends.

In the prior art, a method for implementing short-distance discovery is performed based on an absolute position of a user. This method requires a user to report, in real time, a position of the user, for example, cell ID information or GPS position information of the user, to a certain location server in a network. The location server in the network calculates a distance between two users according to cell ID information or the GPS position information of devices of the two users, and if a certain condition is satisfied, determines that the two users fall within a "short-distance" range. For example, it is learned, according to cell ID information of two UEs, that the two UEs have a same cell ID, it is determined that the two users fall within a "short-distance" range; further, short-distance communication can be established between two short-distance devices.

The method for learning devices within a short-distance range according to a cell ID can implement short-distance discovery between devices, but cannot ensure precision of short-distance user discovery, which degrades experience of a user when using short-distance discovery.

SUMMARY

Embodiments of the present invention provide a device discovery method, apparatus, and system, which can improve precision of short-distance user discovery. The technical solutions are as follows:

According to one aspect, a device discovery method is provided, where the method includes: enabling, by a first device, a device-to-device D2D monitoring and broadcasting function; after the first device detects broadcast information of a second device, reporting the broadcast information of the second device and a user identifier of a target user to a network side, so that the network side obtains, according to the broadcast information of the second device, an identifier of a user that logs in to the second device, and determines whether the identifier of the user that logs in to the second device is the user identifier of the target user; and receiving, by the first device, a result of the determining returned by the network side, and confirming, by the first device according to the result of the determining, whether a device to which the target user logs in falls within a preset distance from the first device.

According to another aspect, a device discovery method is further provided, where the method includes: receiving, by an application server, broadcast information of a second device and a user identifier of a target user that are sent by a first device; obtaining, by the application server according to the broadcast information of the second device, an identifier of a user that logs in to the second device, and if the application server obtains the identifier of the user that logs in to the second device, determining whether the identifier of the user that logs in to the second device is the user identifier of the target user; and returning, by the application server, a result of the determining to the first device, so that the first device can confirm, according to the result of the determining, whether a device to which the target user logs in falls within a preset distance from the first device.

According to another aspect, a device discovery method is further provided, where the method includes: receiving, by an application server, a device identification of a second device and a user identifier of a target user that are sent by a first device, where the device identification of the second device is obtained by the first device by requesting from a short-distance server according to detected broadcast information of the second device; querying, by the application server according to the device identification of the second device, an identifier of a user that logs in to the second device, and if the application server finds the identifier of the user that logs in to the second device, determining whether the identifier of the user that logs in to the second device is the user identifier of the target user; and returning, by the application server, a result of the determining to the first device, so that the first device can confirm, according to the result of the determining, whether a device to which the target user logs in falls within a preset distance from the first device.

According to another aspect, a device discovery method is further provided, where the method includes: receiving, by a short-distance server, broadcast information, which is detected by a first device and sent by the first device, of a second device; and querying, by the short-distance server, a device identification of the second device according to the broadcast information of the second device, and if the short-distance server finds the device identification of the second device, returning the device identification of the second device to the first device, so that the first device sends the device identification of the second device and a user identifier of a target user to an application server, the application server queries, according to the device identification of the second device, an identifier of a user that logs in to the second device, determines whether the identifier of the user that logs in to the second device is the user identifier of the target user, and returns a result of the determining to the first device, so that the first device can confirm, according to the result of the determining, whether a device to which the target user logs in falls within a preset distance from the first device.

According to another aspect, a device discovery method is further provided, where the method includes: receiving, by a short-distance server, broadcast information, which is detected by a first device and sent by an application server, of a second device; querying, by the short-distance server, a device identification of the second device according to the broadcast information of the second device, and if the short-distance server finds the device identification of the second device, returning the device identification of the second device to the application server, so that the application server queries, according to the device identification of the second device, an identifier of a user that logs in to the second device, determines whether the identifier of the user that logs in to the second device is a user identifier of a target user, and returns a result of the determining to the first device, so that the first device can confirm, according to the result of the determining, whether a device to which the target user logs in falls within a preset distance from the first device.

According to another aspect, a device discovery method is further provided, including: enabling, by a second device, a device-to-device D2D monitoring and broadcasting function; and broadcasting, by the second device, broadcast information of the second device by using the D2D function, so that a first device can detect the broadcast information of the second device, and the first device reports the broadcast information of the second device and a user identifier of a target user to a network side, so as to confirm whether a device to which the target user logs in falls within a preset distance from the first device.

According to another aspect, a device discovery apparatus is further provided, where the apparatus includes: an enabling module, configured to enable a device-to-device D2D monitoring and broadcasting function; an application module, configured to: after the enabling module enables the D2D monitoring and broadcasting function, if broadcast information of a second device is detected, report the broadcast information of the second device and a user identifier of a target user to a network side, so that the network side obtains, according to the broadcast information of the second device, an identifier of a user that logs in to the second device, and determines whether the identifier of the user that logs in to the second device is the user identifier of the target user; and a device discovery module, configured to: after the application module reports the broadcast information of the second device and the user identifier of the target user, receive a result of the determining returned by the network side, and confirm, according to the result of the determining, whether a device to which the target user logs in to falls within a preset distance from the device discovery module.

According to another aspect, an application server is further provided, where the server includes: a receiving module, configured to send broadcast information of a second device and a user identifier of a target user that are sent by a first device; a confirming module, configured to obtain, according to the broadcast information, which is received by the receiving module, of the second device, an identifier of a user that logs in to the second device, and if the identifier of the user that logs in to the second device is obtained, determine whether the identifier of the user that logs in to the second device is the user identifier, which is received by the receiving module, of the target user; and a sending module, configured to return a result of the determining, which is confirmed by the confirming module, to the first device, so that the first device can confirm, according to the result of the determining, whether a device to which the target user logs in falls within a preset distance from the first device.

According to another aspect, another application server is further provided, where the server includes: a receiving module, configured to receive a device identification of a second device and a user identifier of a target user that are sent by a first device, where the device identification of the second device is obtained by the first device by requesting from a short-distance server according to detected broadcast information of the second device; a confirming module, configured to query, according to the device identification, which is received by the receiving module, of the second device, an identifier of a user that logs in to the second device, and if the identifier of the user that logs in to the second device is found, determine whether the identifier of the user that logs in to the second device is the user identifier, which is received by the receiving module, of the target user; and a sending module, configured to return a result of the determining, which is confirmed by the confirming module, to the first device, so that the first device can confirm, according to the result of the determining, whether a device to which the target user logs in falls within a preset distance from the first device.

According to another aspect, a short-distance server is further provided, where the server includes: a receiving module, configured to receive broadcast information, which is detected by a first device and sent by the first device, of a second device; and a querying module, configured to query a device identification of the second device according to the broadcast information, which is received by the receiving module, of the second device, and if the device identification of the second device is found, return the device identification of the second device to the first device, so that the first device sends the device identification of the second device and a user identifier of a target user to an application server, so that the application server queries, according to the device identification of the second device, an identifier of a user that logs in to the second device, determines whether the identifier of the user that logs in to the second device is the user identifier of the target user, and returns a result of the determining to the first device, and the first device can confirm, according to the result of the determining, whether a device to which the target user logs in falls within a preset distance from the first device.

According to another aspect, another short-distance server is further provided, where the server includes: a receiving module, configured to receive broadcast information, which is detected by a first device and sent by an application server, of a second device; and a querying module, configured to query a device identification of the second device according to the broadcast information, which is received by the receiving module, of the second device, and if the device identification of the second device is found, return the device identification of the second device to the application server, so that the application server queries, according to the device identification of the second device, an identifier of a user that logs in to the second device, determines whether the identifier of the user that logs in to the second device is a user identifier of a target user, and returns a result of the determining to the first device, so that the first device can confirm, according to the result of the determining, whether a device to which the target user logs in falls within a preset distance from the first device.

According to another aspect, another device discovery apparatus is further provided, where the apparatus includes: an enabling module, configured to enable a device-to-device D2D monitoring and broadcasting function; a broadcasting module, configured to broadcast broadcast information of the apparatus after the enabling module enables the D2D monitoring and broadcasting function, so that a first device can detect the broadcast information, and the first device reports the broadcast information and a user identifier of a target user to a network side, so as to confirm whether a device to which the target user logs in falls within a preset distance from the first device.

According to another aspect, a device discovery system is further provided, where the system includes: the device discovery apparatus described above, the application server described above, the another short-distance server described above, and the another device discovery apparatus described above.

According to another aspect, a device discovery system is further provided, where the system includes: the device discovery apparatus described above, the another application server described above, the short-distance server described above, and the another device discovery apparatus described above.

The technical solutions provided by the embodiments of the present invention produce the following beneficial effects: A first device enables a device-to-device (D2D) monitoring and broadcasting function; after the first device detects broadcast information of a second device, sends the broadcast information of the second device and a user identifier of a target user to a network side, so that the network side obtains, according to the broadcast information of the second device, an identifier of a user that logs in to the second device, and determines whether the identifier of the user that logs in to the second device in the user identifier of the target user; and the first device receives a result of the determining returned by the network side, and the first device confirms, according to the result of the determining, whether a device to which the target user logs in falls within a preset distance from the first device. Because the first device can monitor broadcast information of another device within the preset distance, the first device sends, after detecting broadcast information of the another device, the detected broadcast information and the user identifier of the target user that needs to be discovered to the network side, so that the network side can confirm whether the target user falls within the preset distance from the first device according to the broadcast information and the user identifier of the target user. This improves precision of short-distance user discovery and solves a problem in the prior art in which precision of short-distance user discovery cannot be ensured by using a cell ID.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention more comprehensible, the following further describes the embodiments of the present invention in detail with reference to the accompanying drawings.

Because short-distance communication has a certain distance limit, when cell ID information is used to determine whether two UEs fall within a short-distance range, on one hand, if a cell in which the two UEs are located has a relatively large radius, even if it is determined according to cell IDs of the two UEs that two users fall within a "short-distance" range, it is possible that an actual distance between the two UEs is very large, and may not satisfy a requirement of short-distance communication; on the other hand, two users belonging to two neighboring cells but within a very short distance may also be determined to be not within a short-distance range, resulting in that two devices that communicate within a short distance cannot implement short-distance communication. In some areas, for example, a large indoor shopping mall, a user cannot receive a GPS signal.

Figure 1:
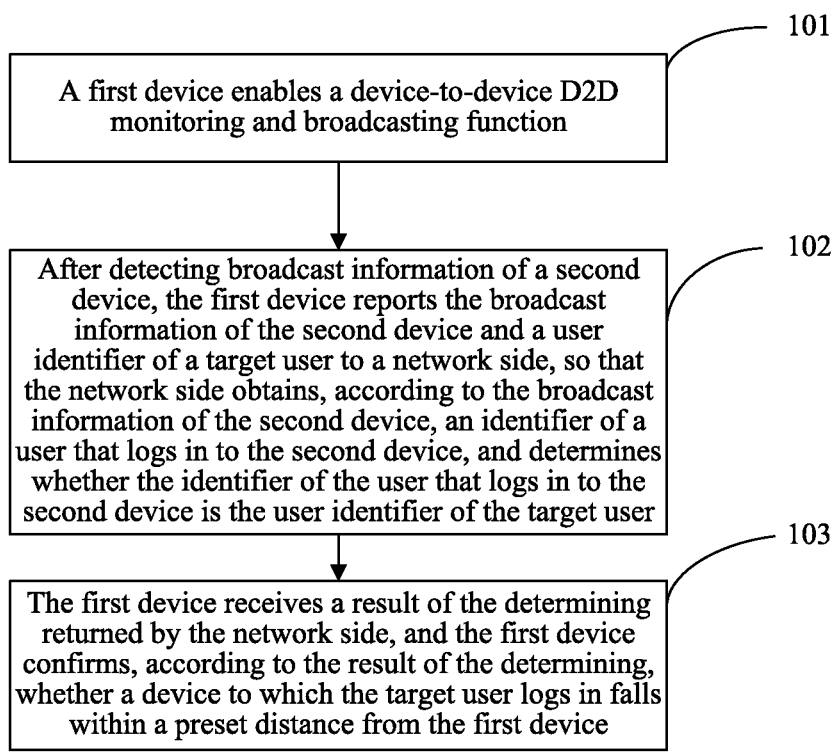
FIG. 1 is a flowchart of a device discovery method according to an embodiment of the present invention.

The foregoing short-distance discovery method cannot ensure precision of short-distance user discovery, which degrades experience of a user when using short-distance discovery. To solve the foregoing problem, the present invention provides the following technical solution:

Referring to FIG. 1, an embodiment provides a device discovery method, which includes the following steps.

101. A first device enables a device-to-device D2D monitoring and broadcasting function.

102. After the first device detects broadcast information of a second device, the first device reports the broadcast information of the second device and a user identifier of a target user to a network side, so that the network side obtains, according to the broadcast information of the second device, an identifier of a user that logs in to the second device, and determines whether the identifier of the user that logs in to the second device is the user identifier of the target user.

103. The first device receives a result of the determining returned by the network side, and the first device confirms, according to the result of the determining, whether a device to which the target user logs in falls within a preset distance from the first device.

Beneficial effects of this embodiment include the following. A first device enables a device-to-device D2D monitoring and broadcasting function; after the first device detects broadcast information of a second device, the first device sends the broadcast information of the second device and a user identifier of a target user to a network side, so that the network side obtains, according to the broadcast information of the second device, an identifier of a user that logs in to the second device, and determines whether the identifier of the user that logs in to the second device in the user identifier of the target user; and the first device receives a result of the determining returned by the network side, and the first device confirms, according to the result of the determining, whether a device to which the target user logs in falls within a preset distance from the first device.

Because the first device can monitor broadcast information of another device within the preset distance, the first device only needs to send, after detecting the broadcast information of the another device, the detected broadcast information and the user identifier of the target user that needs to be discovered to the network side, so that the network side can confirm, according to the broadcast information and the user identifier of the target user, whether the target user falls within the preset distance from the first device. This improves precision of short-distance user discovery, and solves a problem in the prior art in which precision of short-distance user discovery cannot be ensured by using a cell ID.

Figure 2:
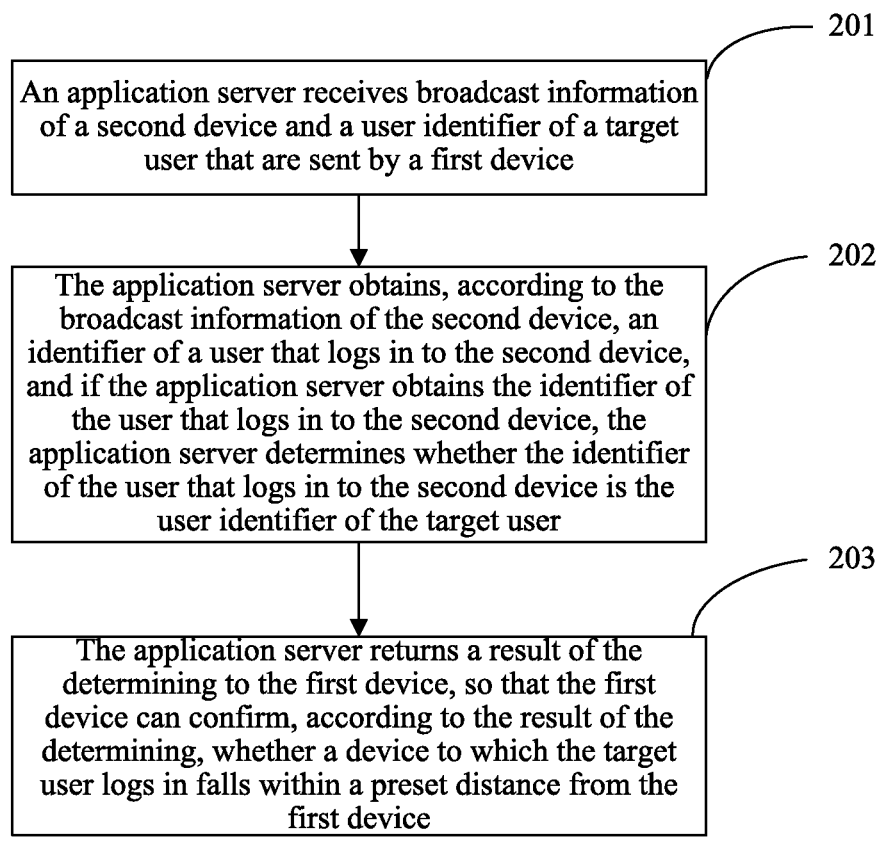
FIG. 2 is a flowchart of a device discovery method according to an embodiment of the present invention.

Referring to FIG. 2, an embodiment provides another device discovery method, which includes the following steps.

201. An application server receives broadcast information of a second device and a user identifier of a target user that are sent by a first device.

202. The application server obtains, according to the broadcast information of the second device, an identifier of a user that logs in to the second device, and if the application server obtains the identifier of the user that logs in to the second device, the application server determines whether the identifier of the user that logs in to the second device is the user identifier of the target user.

203. The application server returns a result of the determining to the first device, so that the first device can confirm, according to the result of the determining, whether a device to which the target user logs in falls within a preset distance from the first device.

Beneficial effects of this embodiment are: An application server receives broadcast information of a second device and a user identifier of a target user that are sent by a first device; the application server obtains, according to the broadcast information of the second device, an identifier of a user that logs in to the second device, and if the application server obtains the identifier of the user that logs in to the second device, determines whether the identifier of the user that logs in to the second device in the user identifier of the target user; and the application server returns a result of the determining to the first device, so that the first device can confirm, according to a result of the determining, whether a device to which the target user logs in falls within a preset distance from the first device.

Because the first device can monitor broadcast information of another device within the preset distance, the first device sends, after detecting the broadcast information of the another device, the detected broadcast information and the user identifier of the target user that needs to be discovered to the application server, so that the application server can confirm, according to the broadcast information and the user identifier of the target user, whether the target user falls within the preset distance from the first device. This improves precision of short-distance user discovery, and solves a problem in the prior art in which precision of short-distance user discovery cannot be ensured by using a cell ID.

Figure 3:
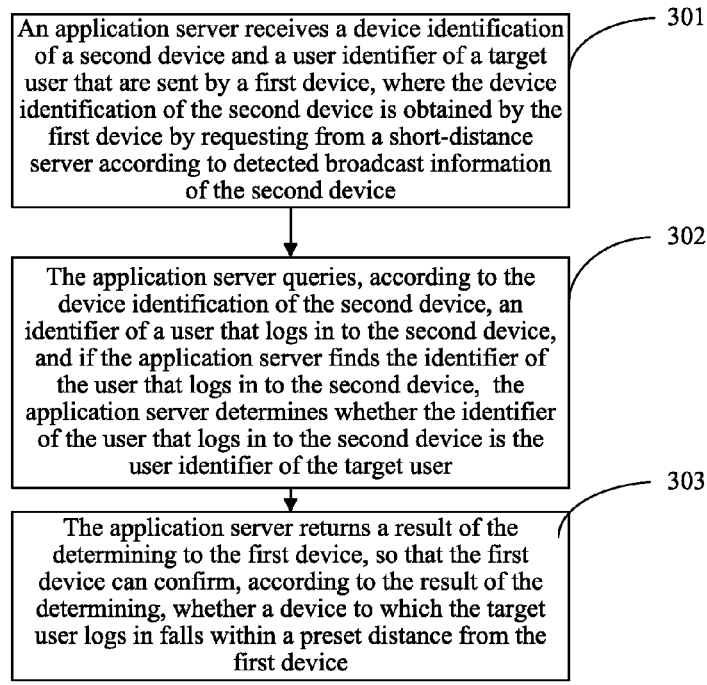
FIG. 3 is a flowchart of a device discovery method according to an embodiment of the present invention.

Referring to FIG. 3, an embodiment provides a device discovery method, which includes the following steps.

301. An application server receives a device identification of a second device and a user identifier of a target user that are sent by a first device, where the device identification of the second device is obtained by the first device by requesting from a short-distance server according to detected broadcast information of the second device.

302. The application server queries, according to the device identification of the second device, an identifier of a user that logs in to the second device, and if the application server finds the identifier of the user that logs in to the second device, the application server determines whether the identifier of the user that logs in to the second device is the user identifier of the target user.

303. The application server returns a result of the determining to the first device, so that the first device can confirm, according to the result of the determining, whether a device to which the target user logs in falls within a preset distance from the first device.

Beneficial effects of this embodiment are: an application server receives a device identification of a second device and a user identifier of a target user that are sent by a first device, where the device identification of the second device is obtained by the first device by requesting from a short-distance server according to detected broadcast information of the second device; the application server queries, according to the device identification of the second device, an identifier of a user that logs in to the second device, and if the application server finds the identifier of the user that logs in to second device, determines whether the identifier of the user that logs in to the second device is the user identifier of the target user; and the application server returns a result of the determining to the first device, so that the first device can confirm, according to the result of the determining, whether a device to which the target user logs in falls within a preset distance from the first device.

Because the first device can monitor broadcast information of another device within the preset distance, the first device obtains, after detecting the broadcast information of the another device, a device identification of the second device by using the detected broadcast information, and sends the device identification of the second device and the user identifier of the target user to the application server, so that the application server can confirm, according to the device identification of the second device and the user identifier of the target user, whether the target user falls within the preset distance from the first device. This improves precision of short-distance user discovery, and solves a problem in the prior art in which precision of short-distance user discovery cannot be ensured by using a cell ID.

Figure 4:
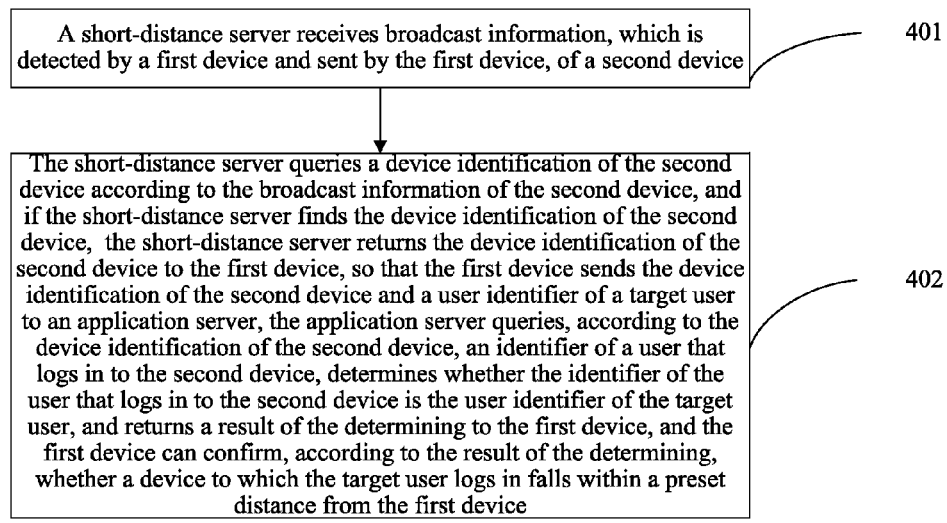
FIG. 4 is a flowchart of a device discovery method according to an embodiment of the present invention.

Referring to FIG. 4, an embodiment provides a device discovery method, which includes the following steps.

401. A short-distance server receives broadcast information, which is detected by a first device and sent by the first device, of a second device.

402. The short-distance server queries a device identification of the second device according to the broadcast information of the second device, and if the short-distance server finds the device identification of the second device, the short-distance server returns the device identification of the second device to the first device, so that the first device sends the device identification of the second device and a user identifier of a target user to an application server, the application server queries, according to the device identification of the second device, an identifier of a user that logs in to the second device, determines whether the identifier of the user that logs in to the second device is the user identifier of the target user, and returns a result of the determining to the first device, so that the first device can confirm, according to a result of the determining, whether a device to which the target user logs in falls within a preset distance from the first device.

Beneficial effects of this embodiment are: A short-distance server receives broadcast information, which is detected by a first device and sent by the first device, of a second device; the short-distance server queries a device identification of the second device according to the broadcast information of the second device, and if the short-distance server finds the device identification of the second device, returns the device identification of the second device to the first device, so that the first device sends the device identification of the second device and a user identifier of a target user to an application server, the application server queries, according to the device identification of the second device, an identifier of a user that logs in to the second device, and determines whether the identifier of the user that logs in to the second device is the user identifier of the target user, and returns a result of the determining to the first device, and the first device can confirm, according to the result of the determining, whether a device to which the target user logs in falls within a preset distance from the first device.

Because the first device can monitor broadcast information of another device within the preset distance, the first device sends, after detecting the broadcast information of the another device, the detected broadcast information to the short-distance server to obtain the device identification of the second device, and sends the device identification of the second device and the user identifier of the target user to the application server, so that the application server can confirm, according to the device identification of the second device and the user identifier of the target user, whether the target user falls within the preset distance from the first device. This improves precision of short-distance user discovery, and solves a problem in the prior art in which precision of short-distance user discovery cannot be ensured by using a cell ID.

Figure 5:
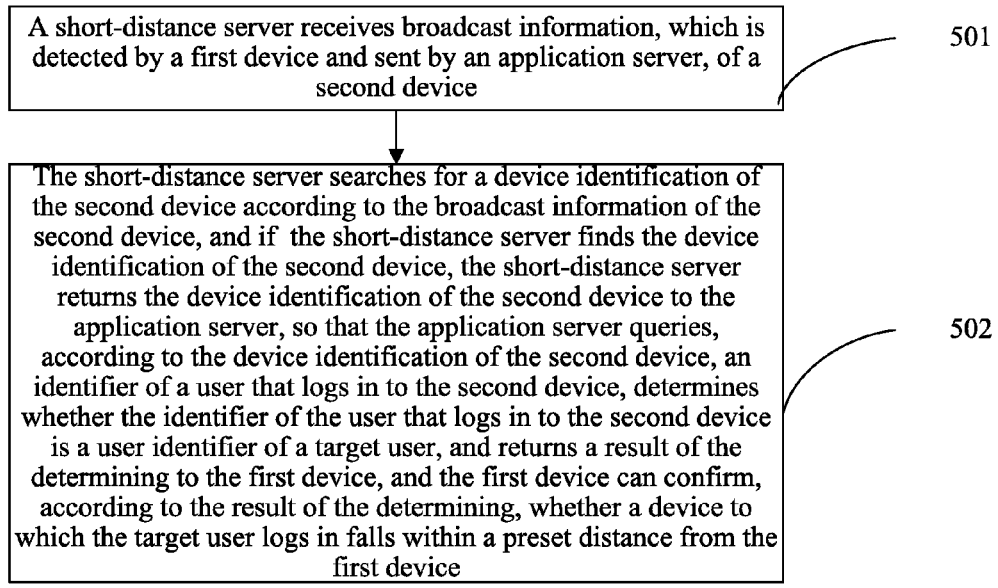
FIG. 5 is a flowchart of a device discovery method according to an embodiment of the present invention.

Referring to FIG. 5, an embodiment provides a device discovery method, which includes the following steps.

501. A short-distance server receives broadcast information, which is detected by a first device and sent by an application server, of a second device.

502. The short-distance server queries a device identification of the second device according to the broadcast information of the second device, and if the short-distance server finds the device identification of the second device, the short-distance server returns the device identification of the second device to the application server, so that the application server queries, according to the device identification of the second device, an identifier of a user that logs in to the second device, determines whether the identifier of the user that logs in to the second device is a user identifier of a target user, and returns a result of the determining to the first device, so that the first device can confirm, according to the result of the determining, whether a device to which the target user logs in falls within a preset distance from the first device.

Beneficial effects of this embodiment are: A short-distance server receives broadcast information, which is detected by a first device and sent by an application server, of a second device; the short-distance server queries, according to the broadcast information of the second device, a device identification of the second device, and if the short-distance server finds the device identification of the second device, the short-distance server returns the device identification of the second device to the application server, so that the application server queries, according to the device identification of the second device, the identifier of the user that logs in to the second device, and determines whether the identifier of the user that logs in to the second device is the user identifier of the target user, and returns a result of the determining to the first device, and the first device can confirm, according to the result of the determining, whether a device to which the target user logs in falls within a preset distance from the first device.

Because the first device can monitor broadcast information of another device within the preset distance, the first device sends, after detecting the broadcast information of the another device, the detected broadcast information and the user identifier of the target user to the application server, so that the application server obtains the device identification of the second device from the short-distance server according to the broadcast information, so as to confirm whether the target user falls within the preset distance from the first device. This improves precision of short-distance user discovery, and solves a problem in the prior art in which precision of short-distance user discovery cannot be ensured by using a cell ID.

Figure 6:
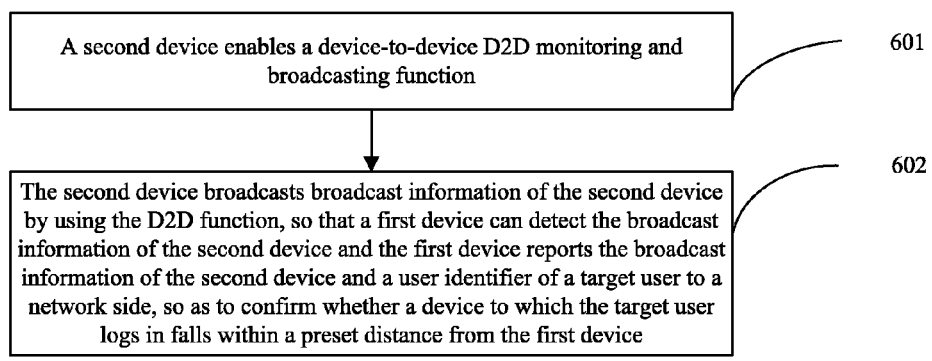
FIG. 6 is a flowchart of a device discovery method according to an embodiment of the present invention.

Referring to FIG. 6, an embodiment provides a device discovery method, which includes the following steps.

601. A second device enables a device-to-device D2D monitoring and broadcasting function.

602. The second device broadcasts broadcast information of the second device by using the D2D monitoring and broadcasting function, so that a first device can detect the broadcast information of the second device and the first device reports the broadcast information of the second device and a user identifier of a target user to a network side, so as to confirm whether a device to which the target user logs in falls within a preset distance from the first device.

Beneficial effects of this embodiment include: A second device enables a device-to-device D2D monitoring and broadcasting function; the second device broadcasts broadcast information of the second device by using the D2D broadcasting function, so that a first device can detect the broadcast information of the second device and the first device reports the broadcast information of the second device and a user identifier of a target user to a network side, so as to confirm whether a device to which the target user logs in falls within a preset distance from the first device.

Because the first device can monitor broadcast information of another device within the preset distance, the second device enables the D2D function and broadcasts the broadcast information of the second device, so that the first device can detect the broadcast information of the second device. After detecting the broadcast information of the second device, the first device reports the broadcast information of the second device and the user identifier of the target user to the network side, so as to confirm whether the target user falls within the preset distance from the first device. This improves precision of short-distance user discovery, and solves a problem in the prior art in which precision of short-distance user discovery cannot be ensured by using a cell ID.

Figure 7:
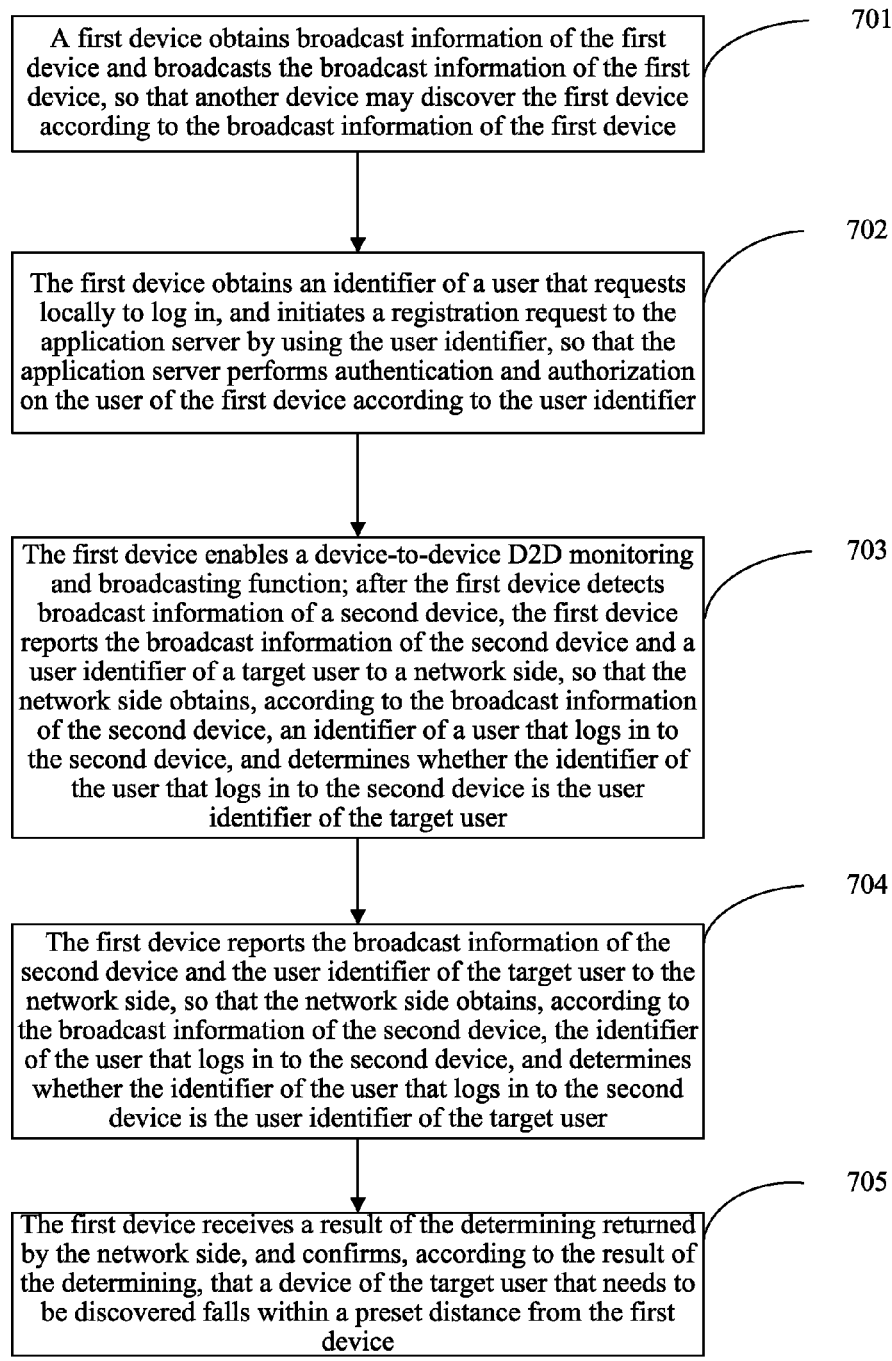
FIG. 7 is a flowchart of a device discovery method according to an embodiment of the present invention.

Referring to FIG. 7, an embodiment provides a device discovery method, which includes the following:

701. A first device obtains broadcast information of the first device and broadcasts the broadcast information of the first device, so that another device can discover the first device according to the broadcast information of the first device.

In this step, in a network attachment process of the first device, a device discovery service request is initiated to a network side; the network side, after receiving the request of the first device, assigns broadcast information (Broadcast Code) to the first device. The first device broadcasts the broadcast information of the first device after enabling a D2D (Device-Device, device-to-device) monitoring and broadcasting function, so that another device can discover the first device. Meanwhile, the first device also monitors Broadcast Code sent by all other devices around. Optionally, the first device may perform broadcasting and monitoring at a preset interval, for example, at an interval of 5 seconds, 8 seconds, 10 seconds, or 1 minute, where the embodiment sets no specific limit thereto. Optionally, the first device may also perform broadcasting and monitoring according to scheduling of a base station. The embodiment sets no specific limit to a manner in which the first device performs the D2D monitoring and broadcasting function.

In this step, optionally, the initiating, by the first device, a device discovery service request to a network side to obtain the broadcast information of the first device includes the following steps.

(1) The first device requests a device discovery service to a mobility management entity (MME) to which the first device belongs.

In this step, the first device initiates a device discovery service request to the MME to which the first device belongs, so as to trigger the MME to obtain the broadcast information of the first device from a short-distance server.

(2) The MME obtains subscription information of the first device from an HSS (home subscriber server), and performs authentication and authorization, according to the subscription information of the device in the HSS, to determine whether the first device can perform the discovery service.

In this step, the MME to which the first device belongs obtains the subscription information of the first device from the HSS after receiving the discovery service request sent by the first device, where the subscription information includes subscription information indicating whether the first device can perform the device discovery service; if the device is allowed to use the device discovery service, the MME requests the short-distance server to assign Broadcast Code to the device; and if the device is not allowed to use the device discovery service, the MME rejects the request of the device and provides a reject reason.

(3) The MME requests the short-distance server to assign the broadcast information to the device.

In this step, the MME has authenticated the first device, and the MME requests the short-distance server to assign the broadcast information to the first device, where the short-distance server is configured to assign broadcast information to a device and manage the broadcast information of the device. The short-distance server may be an independent network element that has an interface with the MME, or be configured to expand some network elements in an existing network to support a function of the short-distance server, so that the expanded network elements can assign the broadcast information to the device. For example, the short-distance server may be implemented by enhancing an MME, a P-CSCF (Proxy-Call Session Control Function), or an HSS, where this embodiment sets no specific limit thereto.

(4) The short-distance server assigns the broadcast information to the first device, and returns the broadcast information assigned to the first device to the MME.

In this step, because the MME has authenticated and authorized the device discovery service of the first device, the short-distance server does not need to perform authentication and authorization on the device again, but directly assigns the Broadcast Code to the device and returns the Broadcast Code to the MME.

It should be noted that the short-distance server may, after assigning unique broadcast information to each device, also periodically update the broadcast information assigned to a certain a device, which is not specifically described in this embodiment. If the short-distance server is positioned to assign different broadcast information to a device, the short-distance server adds time information of the broadcast information to the broadcast information, where the time information includes assigning time and a validity period, so that when the broadcast information is used later, whether the broadcast information is valid broadcast information may be determined according to the assigning time and the validity period of the broadcast information and current time.

(5) The MME sends the broadcast information assigned by the short-distance server to the first device to the first device.

It should be noted that the method used by the first device to obtain the broadcast information of the first device is an operation performed in the network attachment process. However, in a specific device discovery process, it is possible that the device has completed the network attachment process and obtained the broadcast information, and therefore, this step may not be performed in the specific device discovery process.

In this step, optionally, the initiating, by the first device, a device discovery service request to a network side to obtain the broadcast information of the first device includes the following steps.

(1) The first device initiates a registration request to a short-distance server.

In this step, optionally, the first device may obtain the broadcast information of the first device by using an MME, and may also directly initiate the registration request to the short-distance server, so as to trigger the short-distance server to assign the broadcast information to the first device. The short-distance server, after receiving the registration request of the device, performs authentication and authorization locally on a device discovery service of the first device; if the device is allowed to use the device discovery service, the short-distance server assigns the broadcast information (Broadcast Code) to the device; and if the device is not allowed to use the device discovery service, the short-distance server rejects the request of the device and provides a reject reason.

Optionally, the authentication and authorization performed by the short-distance server on the device discovery service of the first device may not by performed locally, but is performed by querying subscription information of the device from an HSS, and determining, by using the subscription information of the device, whether the device is allowed to use the device discovery service.

In a specific actual operation, this embodiment sets no specific limit to a method used by the short-distance server to perform authentication and authorization on the device discovery service of the first device.

(2) The short-distance server assigns the broadcast information to the first device, and sends the broadcast information to the first device.

It should be noted that the method used by the first device to obtain the broadcast information of the first device is performed by obtaining from the short-distance server; however, in a specific device discovery process, it is possible that the device has obtained the broadcast information from the short-distance server. Therefore, this step may not be performed in the specific device discovery process.

It should be noted that in a specific operation, this embodiment sets no specific limit to a method that is specifically used by the first device to initiate the device discovery service request to the network side to obtain the broadcast information of the first device.

This embodiment is described by using the first device as an example; a process for initiating a device discovery service request by another device to a network side is the same as or similar to that of the first device, which is not specifically described in this embodiment.

702. The first device obtains an identifier of a local user that requests to log in, and initiates a registration request to an application server by using the identifier of the user, so that the application server performs authentication and authorization on the user of the first device according to the identifier of the user.

In this embodiment, optionally, the user of the first device may log in to the application server by using an application. For example, the user logs in to an instant messaging application server by using an instant messaging chat tool. There is a corresponding user identifier corresponding to a different application. The user needs to enter a corresponding user identifier when logging in to the application server by using a certain application; the first device, after obtaining the identifier of the local user that requests to log in, initiates a registration request to the application server according to the user identifier, and carries a device identification (Device ID) of the first device in the registration request; and the application server stores the device identification of the first device, and stores a mapping relationship between the identifier of the user that logs in to the first device and the device identification of the first device. The application server performs authentication and authorization on the user of the first device according to the user identifier after receiving the registration request of the first device. In this embodiment, each device corresponds to one unique device identification.

It should be noted that this step is performed when the device registers with the application server; however, in a specific operation, it is possible that the device has completed a registration process. Therefore, this step may not be performed in a specific device discovery process. Alternatively, when the first device in this embodiment starts the device discovery service not because of an application, this step may also not be performed, where this embodiment sets no specific limit thereto.

In this step, all devices that receive a login request of a user initiate a registration request to an application server. This embodiment is described by using the first device as an example; a process in which another device initiates registration with an application server is the same as or similar to that the process of the first device, which is not specifically described in this embodiment.

703. The first device enables a device-to-device D2D monitoring and broadcasting function; after the first device detects broadcast information of a second device, the first device reports the broadcast information of the second device and a user identifier of a target user to a network side, so that the network side obtains, according to the broadcast information of the second device, an identifier of a user that logs in to the second device, and determines whether the identifier of the user that logs in to the second device is the user identifier of the target user.

In this step, the D2D monitoring and broadcasting function of the first device is performed to monitor broadcast information of another device except the first device and broadcast the broadcast information of the first device at the same time. It is possible that one or more pieces of broadcast information are detected by the first device, where this embodiment sets no specific limit thereto. This embodiment is described by using an example in which the broadcast information of the second device is detected by the first device.

It should be noted that the user of the first device may initiate a registration request to the application server after the first device enables the D2D monitoring and broadcasting function; therefore, this embodiment sets no specific limit to a sequence of performing the step 702 and step 703.

704. The first device reports the broadcast information of the second device and the user identifier of the target user to the network side, so that the network side obtains, according to the broadcast information of the second device, the identifier of the user that logs in to the second device, and determines whether the identifier of the user that logs in to the second device is the user identifier of the target user.

In this embodiment, after detecting the broadcast information of the another device, the first device initiates a device discovery request to the network side and sends the user identifier of the target user that needs to be discovered and the detected broadcast information of the another device to the network side, so that the network side obtains, according to the broadcast information of the another device, an identifier of a user that logs in to the device, and determines whether the identifier of the user that logs in to the device is the user identifier of the target user that the first device needs to discover.

In this step, optionally, the network side includes an application server and a short-distance server, and communication can be performed between the application server and the short-distance server; the reporting, by the first device, the detected broadcast information of the second device and a user identifier of a target user to a network side, so that the network side obtains, according to the broadcast information of the second device, an identifier of a user that logs in to the second device, and determines whether the identifier of the user that logs in to the second device is the user identifier of the target user includes the following:

(1) The first device sends the broadcast information of the second device and the user identifier of the target user to the application server.

In this step, the first device sends the broadcast information of the second device and the user identifier of the target user to the application server on the network side, so as to trigger the application server to obtain, according to the broadcast information of the second device, the identifier of the user that logs in to the second device, and determines whether the identifier of the user that logs in to the second device is the user identifier of the target user that the first device needs to discover.

(2) The application server obtains, according to the broadcast information of the second device, the identifier of the user that logs in to the second device, and determines whether the identifier of the user that logs in to the second device is the user identifier of the target user that the first device needs to discover.

In this step, the application server locally queries the identifier of the user that logs in to the second device, where the identifier corresponds to the broadcast information of the second device. If the broadcast information of the second device carries time information, after the broadcast information of the second device is received, whether the broadcast information is valid broadcast information further needs to be determined; and if yes, the application server obtains the identifier, which is corresponding to the broadcast information of the second device, of the user that logs in to the second device. If no broadcast information of the second device is found locally or the found broadcast information is invalid broadcast information, the application server requests a device identification of the second device from the short-distance server on the network side according to the broadcast information of the second device; the application server receives and stores the device identification of the second device returned by the short-distance server, and queries, according to the device identification of the second device, the identifier of the user that logs in to the second device. In this step, optionally, the application server stores broadcast information corresponding to a device identification of each device, where the broadcast information can be subsequently queried by another application.

In this step, optionally, the application server may, without locally querying the broadcast information of the second device, directly query the short-distance server for the broadcast information of the second device, where this embodiment sets no specific limit thereto.

In this step, the short-distance server queries the device identification corresponding to the broadcast information; if the short-distance server does not have the device identification corresponding to the broadcast information, an indication of non-assignment is returned to the first device.

In this step, after the identifier of the user that logs in to the second device is obtained, it needs to be further determined whether the identifier of the user is the user identifier of the target user that the first device needs to discover, where a method for specifically determining whether two user identifiers are the same belongs to the prior art, which is not described in this embodiment.

(3) The application server returns a result of the determining to the first device.

In this step, the application server returns the result of the determining to the first device after determining whether the identifier of the user that logs in to the second device is the user identifier of the target user that the first device needs to discover.

In this step, optionally, the network side includes an application server and a short-distance server, and communication cannot be performed between the application server and the short-distance server; the reporting, by the first device, the broadcast information of the second device and a user identifier of a target user to a network side, so that the network side obtains, according to the broadcast information of the second device, an identifier of a user that logs in to the second device, and determines whether the identifier of the user that logs in to the second device is the user identifier of the target user includes the following steps.

(1) The first device sends the broadcast information of the second device to the short-distance server.

In this step, the first device sends the broadcast information of the second device to the short-distance server, so as to requests the short-distance server to query a device identification of the second device.

(2) The short-distance server queries the device identification of the second device according to the broadcast information of the second device, and returns the device identification of the second device to the first device.

In this step, the short-distance server queries the device identification corresponding to the broadcast information after receiving the broadcast information of the second device, so as to obtain the device identification of the second device; and returns the found device identification of the second device to the first device.

In this step, the short-distance server queries the device identification corresponding to the broadcast information; if the short-distance server does not have the device identification corresponding to the broadcast information, an indication of unknown broadcast information is returned to the first device.

(3) The first device receives the device identification of the second device returned by the short-distance server, and sends the device identification of the second device and the user identifier of the target user that needs to be discovered to the application server.

(4) The application server queries, according to the received identifier of the second device, the identifier of the user that logs in to the second device, and determines whether the identifier of the user that logs in to the second device is the user identifier of the target user that the first device needs to discover.

(5) The application server returns a result of the determining to the first device.

It should be noted that in a specific operation, this embodiment sets no specific limit to a specific method that is used to obtain the result of the determining.

705. The receives the result of the determining returned by the network side, and confirms, according to the result of the determining, whether a device of the target user that needs to be discovered falls within a preset distance from the first device.

In this step, if the result of the determining returned by the application server to the first device is yes, that is, a result indicating that the identifier of the user that logs in to the second device is the user identifier of the user that needs to be discovered, the first device confirms that the device of the target user that needs to be discovered falls within the preset distance from the first device; if the result of the determining returned by the application server to the first device is no, that is, a result indicating that the identifier of the user that logs in to the second device is not the user identifier of the user that needs to be discovered, the first device confirms that the device of the target user that needs to be discovered does not fall within the preset distance from the first device.

In addition, it should be noted that a step/message in the foregoing embodiments is not necessarily a newly defined step/message, where transmission may also be performed by expanding an existing step/message between two same network elements. This principle is applicable to an interface between a device and any network elements, for example, between a UE and an MME/HSS, between a UE and an application server, where this embodiment sets no specific limit thereto.

Beneficial effects of this embodiment include: A first device enables a device-to-device D2D monitoring and broadcasting function; after the first device detects broadcast information of a second device, the first device sends the broadcast information of the second device and a user identifier of a target user to a network side, so that the network side obtains, according to the broadcast information of the second device, an identifier of a user that logs in to the second device, and determines whether the identifier of the user that logs in to the second device in the user identifier of the target user; and the first device receives a result of the determining returned by the network side, and the first device confirms, according to the result of the determining, whether a device to which the target user logs in falls within a preset distance from the first device.

Because the first device can monitor broadcast information of another device within the preset distance, the first device only needs to send, after detecting the broadcast information of the another device, the detected broadcast information and the user identifier of the target user that needs to be discovered to the network side, so that the network side can confirm, according to the broadcast information and the user identifier of the target user, whether the target user falls within the preset distance from the first device. This improves precision of short-distance user discovery, and solves a problem in the prior art in which precision of short-distance user discovery cannot be ensured by using a cell ID. In addition, if the first device can monitor the second device, it is highly possible that the first device can establish short-distance communication with the second device, which increases a success probability of short-distance communication.

Moreover, the device obtains the broadcast information of the first device in a network attachment process or obtains the broadcast information by using the short-distance server, which is easy to implement and simplifies operations, and causes no additional heavy burden on an existing network. Moreover, the user can initiate a device discovery service by using an application, where the application stores a friend of the device user, which makes it more convenient for the user to discover a friend that exists within a short distance, thereby improving experience of the user using device discovery.

Figure 8:
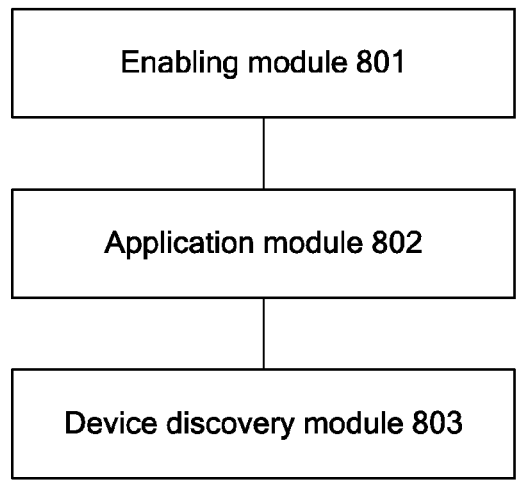
FIG. 8 is a schematic diagram of a device discovery apparatus according to an embodiment of the present invention.

Referring to FIG. 8, an embodiment provides a device discovery apparatus 800, which includes an enabling module 801, an application module 802, and a device discovery module 803.

The enabling module 801 is configured to enable a device-to-device D2D monitoring and broadcasting function.

The application module 802 is configured to: after the enabling module 801 enables the D2D monitoring and broadcasting function, if broadcast information of a second device is detected, report the broadcast information of the second device and a user identifier of a target user to a network side, so that the network side obtains, according to the broadcast information of the second device, an identifier of a user that logs in to the second device, and determines whether the identifier of the user that logs in to the second device is the user identifier of the target user.

The device discovery module 803 is configured to: after the application module reports the broadcast information of the second device and the user identifier of the target user, receive a result of the determining returned by the network side, and confirm, according to the result of the determining, whether a device to which the target user logs in to falls within a preset distance from the device discovery module.

Figure 9:
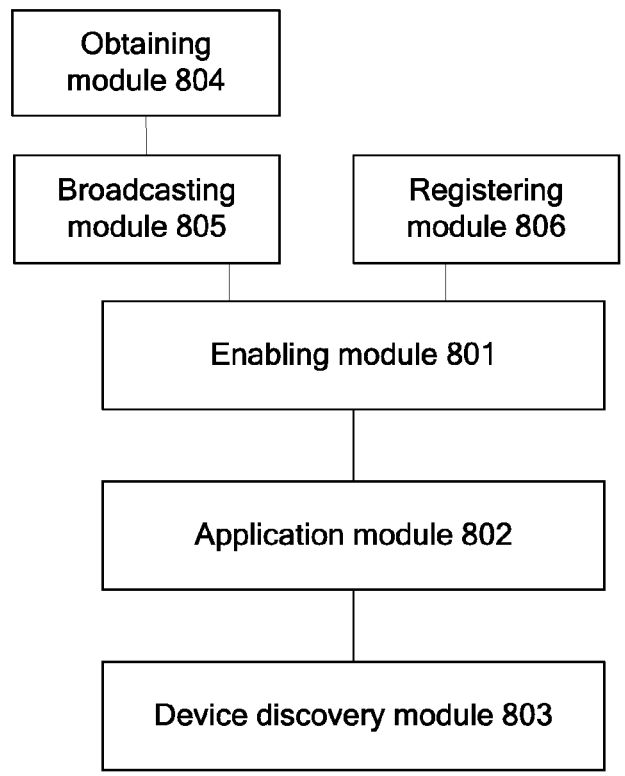
FIG. 9 is a schematic diagram of another device discovery apparatus according to an embodiment of the present invention.

Referring to FIG. 9, optionally, the apparatus further includes: an obtaining module 804, configured to: before the enabling module 801 enables the D2D monitoring and broadcasting function, obtain broadcast information of the apparatus; and a broadcasting module 805, configured to: after the enabling module 801 enables the D2D monitoring and broadcasting function, broadcast the broadcast information obtained by the obtaining module 804, so that the apparatus can be discovered by another device except the apparatus according to the broadcast information.

Optionally, the obtaining module 804 includes: a first requesting unit, configured to initiate a device discovery service request to a mobility management entity MME to which the first requesting unit belongs, so as to trigger the MME to obtain the broadcast information of the apparatus from a short-distance server; and a first receiving unit, configured to: after the first requesting unit initiates the device discovery service request, receive the broadcast information of the first device returned by the MME.

Optionally, the obtaining module 804 includes: a second requesting unit, configured to initiate a registration request to a short-distance server, so as to trigger the short-distance server to assign the broadcast information to the apparatus; and a second receiving unit, configured to: after the second requesting unit initiates the registration request, receive the broadcast information of the first device returned by the short-distance server.

Referring to FIG. 9, optionally, the apparatus further includes: a registering module 806, configured to: before the enabling module 801 enables the D2D monitoring and broadcasting function, obtain a local user identifier, and initiate a registration request to an application server according to the user identifier, where the registration request includes a device identification, so that the application server stores the device identification and performs authentication and authorization on the user identifier.

Optionally, the application module 802 includes: a first sending unit, configured to: when the network side includes the application server and the short-distance server, and communication can be performed between the application server and the short-distance server, send the broadcast information, which is detected by the application module, of the second device and the user identifier of the target user to the application server, so as to trigger the application server to obtain locally or obtain by using the short-distance server, according to the broadcast information of the second device, the identifier of the user that logs in to the second device, and determine whether the identifier of the user that logs in to the second device is the user identifier of the target user.

Optionally, the application module 802 includes: a second sending unit, configured to: when the network side includes the application server and the short-distance server, and communication cannot be performed between the application server and the short-distance server, send the broadcast information, which is detected by the application module, of the second device to the short-distance server, so as to trigger the short-distance server to query a device identification of the second device.

The apparatus further includes: a third receiving unit, configured to receive the device identification of the second device returned by the short-distance server; where the second sending unit is further configured to send the device identification, which is received by the third receiving unit, of the second device and the user identifier of the target user to the application server, so that the application server queries, according to the device identification of the second device, the identifier of the user that logs in to the second device, and determines whether the identifier of the user that logs in to the second device is the user identifier of the target user.

Beneficial effects of this embodiment include: An enabling module is configured to enable a device-to-device D2D monitoring and broadcasting function; an application module is configured to: after the enabling module enables the D2D monitoring and broadcasting function, and if detecting broadcast information of a second device, report the broadcast information of the second device and a user identifier of a target user to a network side, so that the network side obtains, according to the broadcast information of the second device, an identifier of a user that logs in to the second device, and determines whether the identifier of the user that logs in to the second device is the user identifier of the target user; and a device discovery module is configured to: after the application module reports the broadcast information of the second device and the user identifier of the target user, receive a result of the determining returned by the network side, and confirm, according to the result of the determining, whether a device to which the target user logs in to falls within a preset distance from the device discovery module.

Because the apparatus can monitor broadcast information of another device within the preset distance, and after broadcast information of the another device is detected, send the detected broadcast information and the user identifier of the target user to the network side, so that the network side can confirm whether the target user falls within the preset distance from the first device according to the broadcast information and the user identifier of the target user. This improves precision of short-distance user discovery, and solves a problem in the prior art in which precision of short-distance user discovery cannot be ensured by using a cell ID.

Figure 10:
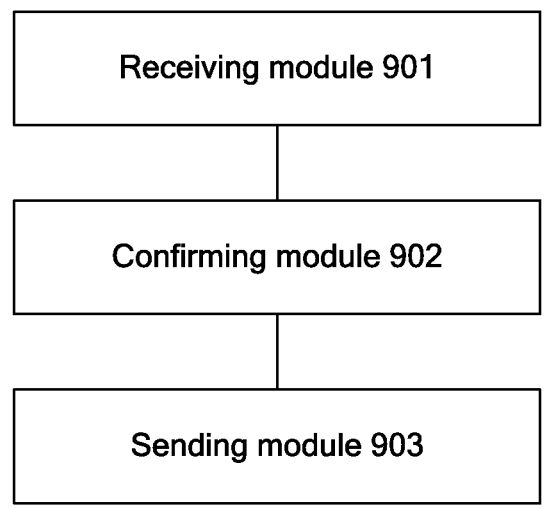
FIG. 10 is a schematic diagram of an application server according to an embodiment of the present invention.

Referring to FIG. 10, an embodiment provides an application server 900, which includes a receiving module 901, a confirming module 902, and a sending module 903.

The receiving module 901 is configured to send broadcast information of a second device and a user identifier of a target user that are sent by a first device.

The confirming module 902 is configured to obtain, according to the broadcast information, which is received by the receiving module 901, of the second device, an identifier of a user that logs in to the second device, and if the identifier of the user that logs in to the second device is obtained, determine whether the identifier of the user that logs in to the second device is the user identifier, which is received by the receiving module 901, of the target user.

The sending module 903 is configured to return a result of the determining, which is confirmed by the confirming module 902, to the first device, so that the first device can confirm, according to the result of the determining, whether a device to which the target user logs in falls within a preset distance from the first device.

Optionally, the confirming module 902 is specifically configured to: query locally the identifier, which is corresponding to the broadcast information of the second device, of the user that logs in to the second device, and obtain the identifier of the user that logs in to the second device; or request, according to the broadcast information of the second device, a device identification of the second device from a short-distance server; receive and store the device identification of the second device returned by the short-distance server, and query, according to the device identification of the second device, the identifier of the user that logs in to the second device, and obtain the identifier of the user that logs in to the second device.

Figure 11:
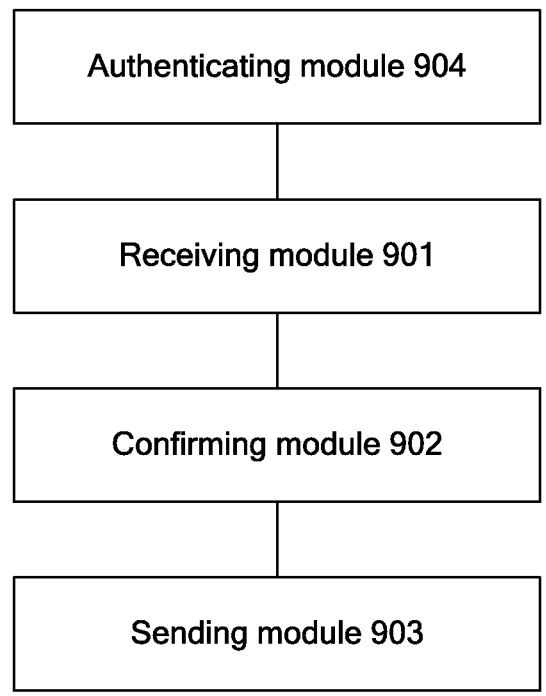
FIG. 11 is a schematic diagram of another application server according to an embodiment of the present invention.

Optionally, referring to FIG. 11, the server further includes: an authenticating module 904, configured to: before the receiving module 901 receives the broadcast information of the second device and the user identifier of the target user that are sent by the first device, receive a registration request sent by the first device, where the registration request includes a device identification of the first device and an identifier of a user that logs in to the first device, store the device identification of the first device, and perform authentication and authorization on the user identifier.

Beneficial effects of this embodiment are: An application server receives broadcast information of a second device and a user identifier of a target user that are sent by a first device; the application server obtains, according to the broadcast information of the second device, an identifier of a user that logs in to the second device, and if the application server obtains the identifier of the user that logs in to the second device, determines whether the identifier of the user that logs in to the second device is the user identifier of the target user; and the application server returns a result of the determining to the first device, so that the first device can confirm, according to the result of the determining, whether a device to which the target user logs in falls within a preset distance from the first device.

Because the first device can monitor broadcast information of another device within the preset distance, the first device sends, after detecting the broadcast information of the another device, the detected broadcast information and the user identifier of the target user that needs to be discovered to the application server, so that the application server can determine, according to the broadcast information and the user identifier of the target user, whether the target user falls within the preset distance from the first device. This improves precision of short-distance user discovery, and solves a problem in the prior art in which precision of short-distance user discovery cannot be ensured by using a cell ID.

Figure 12:
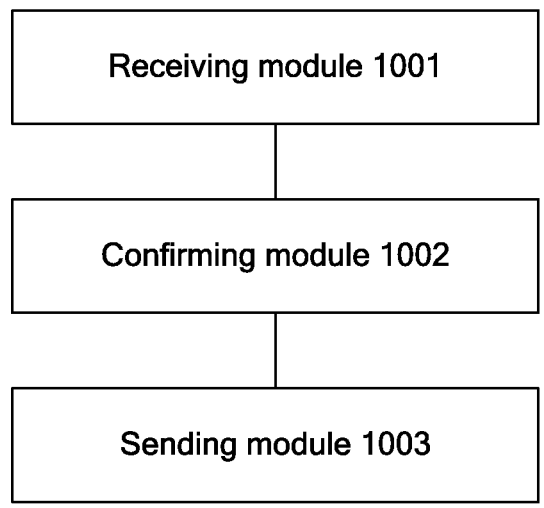
FIG. 12 is a schematic diagram of another application server according to an embodiment of the present invention.

Referring to FIG. 12, an embodiment provides an application server 1000, which includes a receiving module 1001, a confirming module 1002, and a sending module 1003.

The receiving module 1001 is configured to receive a device identification of a second device and a user identifier of a target user that are sent by a first device, where the device identification of the second device is obtained by the first device by requesting from a short-distance server according to detected broadcast information of the second device.

The confirming module 1002 is configured to query, according to the device identification, which is received by the receiving module 1001, of the second device, an identifier of a user that logs in to the second device, and if the application server finds the identifier of the user that logs in to the second device, determine whether the identifier of the user that logs in to the second device is the user identifier, which is received by the receiving module 1001, of the target user.

The sending module 1003 is configured to return a result of the determining, which is confirmed by the confirming module 1002, to the first device, so that the first device can confirm, according to a result of the determining, whether a device to which the target user logs in falls within a preset distance from the first device.

Figure 13:
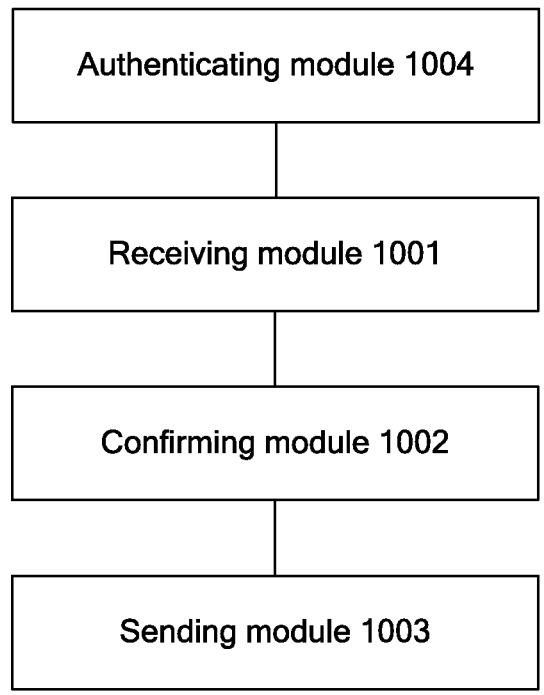
FIG. 13 is a schematic diagram of another application server according to an embodiment of the present invention.

Optionally, referring to FIG. 13, the server further includes: an authenticating module 1004, configured to: before the receiving module 1001 receives the device identification of the second device and the user identifier of the target user that are sent by the first device, receive a registration request sent by the first device, where the registration request includes a device identification of the first device and an identifier of a user that logs in to the first device, store the device identification of the first device, and perform authentication and authorization on the user identifier.

Beneficial effects of this embodiment are: an application server receives a device identification of a second device and a user identifier of a target user that are sent by a first device, where the device identification of the second device is obtained by the first device by requesting from a short-distance server according to detected broadcast information of the second device; the application server queries, according to the device identification of the second device, an identifier of a user that logs in to the second device, and if the application server finds the identifier of the user that logs in to second device, determines whether the identifier of the user that logs in to the second device is the user identifier of the target user; and the application server returns a result of the determining to the first device, so that the first device can confirm, according to the result of the determining, whether a device to which the target user logs in falls within a preset distance from the first device.

Because the first device can monitor broadcast information of another device within the preset distance, the first device obtains, after detecting the broadcast information of the another device, a device identification of the second device by using the detected broadcast information, and sends the device identification of the second device and the user identifier of the target user to the application server, so that the application server can confirm, according to the device identification of the second device and the user identifier of the target user, whether the target user falls within the preset distance from the first device. This improves precision of short-distance user discovery, and solves a problem in the prior art in which precision of short-distance user discovery cannot be ensured by using a cell ID.

Figure 14:
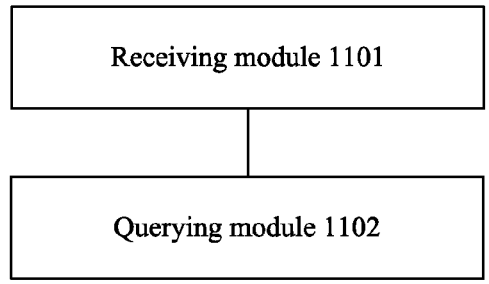
FIG. 14 is a schematic diagram of a short-distance server according to an embodiment of the present invention.

Referring to FIG. 14, an embodiment further provides a short-distance server 1100, which includes a receiving module 1101 and a querying module 1102.

The receiving module 1101 is configured to receive broadcast information, which is detected by a first device and sent by the first device, of a second device.

The querying module 1102 is configured to query a device identification of the second device according to the broadcast information, which is received by the receiving module 1101, of the second device, and if the short-distance server finds the device identification of the second device, return the device identification of the second device to the application server, so that the application server queries, according to the device identification of the second device, an identifier of a user that logs in to the second device, determines whether the identifier of the user that logs in to the second device is a user identifier of a target user, and returns a result of the determining to the first device, so that the first device can confirm, according to the result of the determining, whether a device to which the target user logs in falls within a preset distance from the first device.

Optionally, the receiving module 1101 is further configured to: before receiving the broadcast information, which is detected by the first device and sent by the first device, of the second device, receive a request initiated by a mobility management entity MME to which the first device belongs for obtaining broadcast information of the first device.

Figure 15:
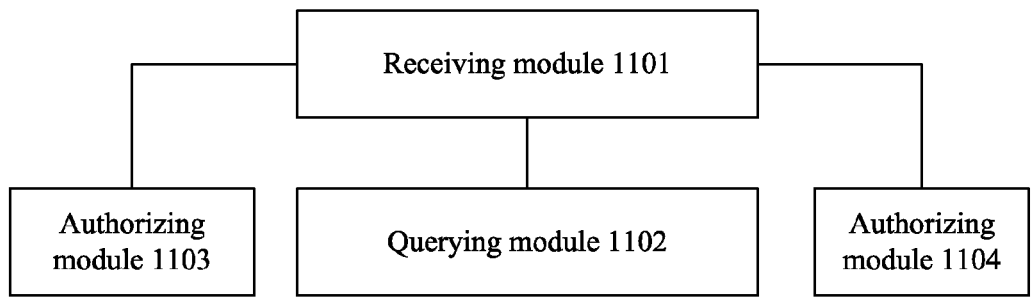
FIG. 15 is a schematic diagram of another short-distance server according to an embodiment of the present invention.

Optionally, referring to FIG. 15, the server further includes: an assigning module 1102, configured to assign the broadcast information to the first device according to the request initiated by the MME, and return the broadcast information to the first device by using the MME.

Optionally, the receiving module 1101 is further configured to: before receiving the broadcast information, which is detected by the first device and sent by the first device, of the second device, receive a registration request initiated by the first device.

Optionally, referring to FIG. 15, the server further includes: an authorizing module 1103, configured to perform authorization on the first device according to the request initiated by the first device, and assign broadcast information to the first device after the authorization succeeds.

Optionally, the authorizing module 1103 is specifically configured to: perform authorization locally on the first device according to the request initiated by the first device; or query, according to the request initiated by the first device, subscription information of the first device from a home subscription server HSS to which the first device belongs, and perform authorization on the first device according to the subscription information of the first device returned by the HSS.

Beneficial effects of this embodiment include the following. A short-distance server receives broadcast information, which is detected by a first device and sent by the first device, of a second device; the short-distance server queries a device identification of the second device according to the broadcast information of the second device, and if the short-distance server finds the device identification of the second device, returns the device identification of the second device to the first device, so that the first device sends the device identification of the second device and a user identifier of a target user to an application server, the application server queries, according to the device identification of the second device, an identifier of a user that logs in to the second device, and determines whether the identifier of the user that logs in to the second device is the user identifier of the target user, and returns a result of the determining to the first device, and the first device can confirm, according to the result of the determining, whether a device to which the target user logs in falls within a preset distance from the first device.

Because the first device can monitor broadcast information of another device within the preset distance, the first device sends, after detecting the broadcast information of the another device, the detected broadcast information to the short-distance server to obtain the device identification of the second device, and sends the device identification of the second device and the user identifier of the target user to the application server, so that the application server can confirm, according to the device identification of the second device and the user identifier of the target user, whether the target user falls within the preset distance from the first device. This improves precision of short-distance user discovery, and solves a problem in the prior art in which precision of short-distance user discovery cannot be ensured by using a cell ID.

Figure 16:
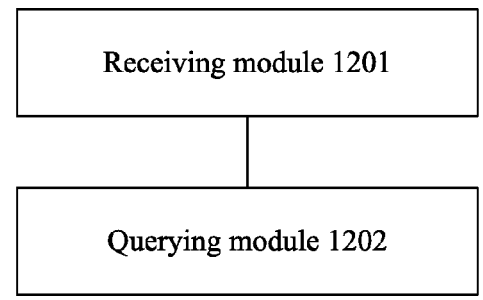
FIG. 16 is a schematic diagram of a short-distance server according to an embodiment of the present invention.

Referring to FIG. 16, an embodiment further provides a short-distance server 1200, which includes a receiving module 1201 and a querying module 1202.

The receiving module 1201 is configured to receive broadcast information, which is detected by a first device and sent by an application server, of a second device. The querying module 1202 is configured to query a device identification of the second device according to the broadcast information, which is received by the receiving module 1201, of the second device, and if the device identification of the second device is found, return the device identification of the second device to the application server, so that the application server queries, according to the device identification of the second device, an identifier of a user that logs in to the second device, determines whether the identifier of the user that logs in to the second device is a user identifier of a target user, and returns a result of the determining to the first device, so that the first device can confirm, according to the result of the determining, whether a device to which the target user logs in falls within a preset distance from the first device.

Optionally, the receiving module 1201 is further configured to: before receiving the broadcast information, which is detected by the first device and sent by the application server, of the second device, receive a request initiated by a mobility management entity MME to which the first device belongs for obtaining broadcast information of the first device.

Figure 17:
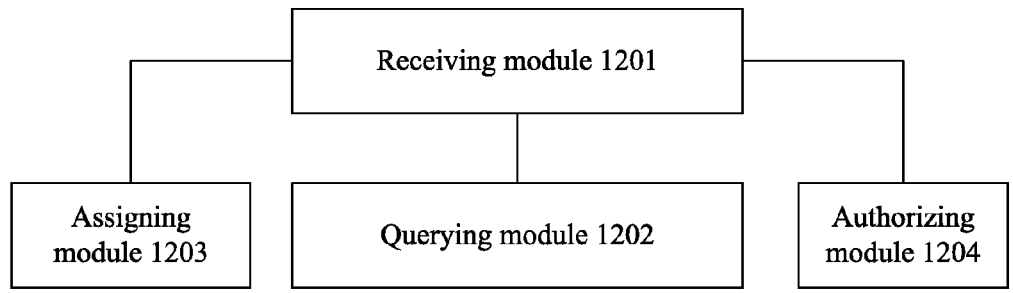
FIG. 17 is a schematic diagram of another short-distance server according to an embodiment of the present invention.

Optionally, referring to FIG. 17, the server further includes: an assigning module 1202, configured to assign the broadcast information to the first device according to the request initiated by the MME, and return the broadcast information to the first device by using the MME.

Optionally, the receiving module 1201 is further configured to: before receiving the broadcast information, which is detected by the first device and sent by the application server, of the second device, receive a registration request initiated by the first device.

Optionally, referring to FIG. 17, the server further includes: an authorizing module 1203, configured to perform authorization on the first device according to the request initiated by the first device, and assign broadcast information to the first device after the authorization succeeds.

Optionally, the authorizing module 1203 is specifically configured to: perform authorization locally on the first device according to the request initiated by the first device; or query, according to the request initiated by the first device, subscription information of the first device from a home subscription server HSS to which the first device belongs, and perform authorization on the first device according to the subscription information of the first device returned by the HSS.

Beneficial effects of this embodiment are: A short-distance server receives broadcast information, which is detected by a first device and sent by an application server, of a second device; the short-distance server queries, according to the broadcast information of the second device, a device identification of the second device, and if the short-distance server finds the device identification of the second device, returns the device identification of the second device to the application server, so that the application server queries, according to the device identification of the second device, the identifier of the user that logs in to the second device, and determines whether the identifier of the user that logs in to the second device is the user identifier of the target user, and returns a result of the determining to the first device, and the first device can confirm, according to the result of the determining, whether a device to which the target user logs in falls within a preset distance from the first device.

Because the first device can monitor broadcast information of another device within the preset distance, the first device sends, after detecting the broadcast information of the another device, the detected broadcast information and the user identifier of the target user to the application server, so that the application server obtains the device identification of the second device from the short-distance server according to the broadcast information, so as to confirm whether the target user falls within the preset distance from the first device. This improves precision of short-distance user discovery, and solves a problem in the prior art in which precision of short-distance user discovery cannot be ensured by using a cell ID.

Figure 18:
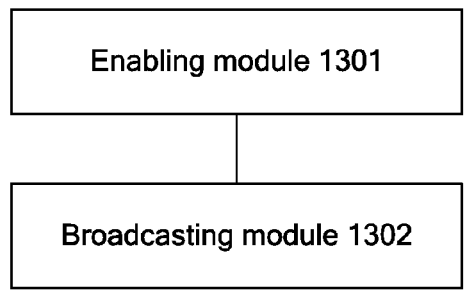
FIG. 18 is a schematic diagram of a device discovery apparatus according to an embodiment of the present invention.

Referring to FIG. 18, an embodiment provides a device discovery apparatus, which includes an enabling module 1301 and a broadcasting module 1302.

The enabling module 1301 is configured to enable a device-to-device D2D monitoring and broadcasting function.

The broadcasting module 1302 is configured to broadcast broadcast information of the apparatus after the enabling module 1301 enables the D2D monitoring and broadcasting function, so that a first device can detects the broadcast information and the first device reports the broadcast information and a user identifier of a target user to a network side, so as to confirm whether a device to which the target user logs in falls within a preset distance from the first device.

Figure 19:
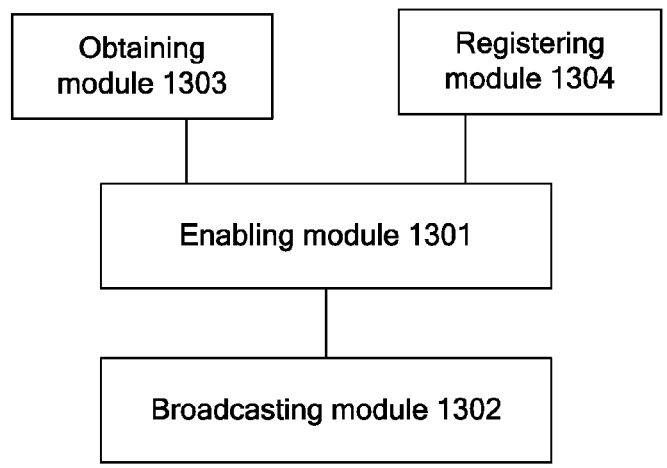
FIG. 19 is a schematic diagram of another device discovery apparatus according to an embodiment of the present invention.

Optionally, referring to FIG. 19, the apparatus further includes: an obtaining module 1303, configured to: before the enabling module 1301 enables the D2D monitoring and broadcasting function, obtain the broadcast information of the apparatus, so that another device except the apparatus can discover the second device according to the broadcast information.

Optionally, the obtaining module 1303 includes: a first requesting unit, configured to initiate a device discovery service request to a mobility management entity MME to which the first requesting unit belongs, so as to trigger the MME to obtain the broadcast information of the apparatus from a short-distance server; and a first receiving unit, configured to: after the first requesting unit initiates the device discovery service request, receive the broadcast information returned by the MME.

Optionally, the obtaining module 1303 includes: a second requesting unit, configured to initiate a registration request to a short-distance server, so as to trigger the short-distance server to assign the broadcast information to the apparatus; and a second receiving unit, configured to: after the second requesting unit initiates the registration request, receive the broadcast information returned by the short-distance server.

Optionally, referring to FIG. 19, the apparatus further includes: a registering module 1304, configured to: before the enabling module 1301 enables the D2D monitoring and broadcasting function, obtain a local user identifier, and initiate a registration request to an application server according to the user identifier, where the registration request includes a device identification thereof, so that the application server stores the device identification and performs authentication and authorization on the user identifier.

Beneficial effects of this embodiment include: An enabling module is configured to enable a device-to-device D2D monitoring and broadcasting function; a broadcasting module, is configured to broadcast broadcast information of the first device after the enabling module enables the D2D monitoring and broadcasting function, so that a first device can detect the broadcast information, and the first device reports the broadcast information and a user identifier of a target user to a network side, so as to confirm whether a device to which the target user logs in falls within a preset distance from the first device.

Because the first device can monitor broadcast information of another device within the preset distance, the apparatus enables the D2D function and broadcasts the broadcast information of the first device, so that the first device can detect the broadcast information of the apparatus. After detecting the broadcast information of the apparatus, the first device reports the broadcast information of the second device and the user identifier of the target user to the network side, so as to confirm whether the target user falls within the preset distance from the first device. This improves precision of short-distance user discovery, and solves a problem in the prior art in which precision of short-distance user discovery cannot be ensured by using a cell ID.

Figure 20:
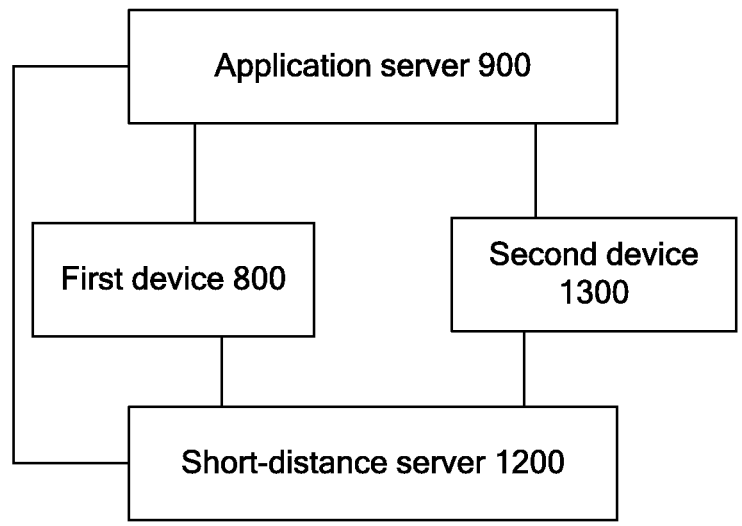
FIG. 20 is a schematic diagram of a device discovery system according to an embodiment of the present invention.

Referring to FIG. 20, an embodiment further provides a device discovery system, where the system includes the device discovery apparatus 800 described above, the application server 900 described above, the short-distance server 1200 described above, and the device discovery apparatus 1300 described above.

Beneficial effects of the embodiment include: A second device enables a device-to-device D2D monitoring and broadcasting function; the second device broadcasts broadcast information of the second device by using the D2D broadcasting function, so that a first device can detect the broadcast information of the second device, and the first device reports the broadcast information of the second device and a user identifier of a target user to a network side, so as to confirm whether a device to which the target user logs in falls within a preset distance from the first device.

Because the first device can monitor broadcast information of another device within the preset distance, the second device enables the D2D function and broadcasts the broadcast information of the second device, so that the first device can detect the broadcast information of the second device, and the first device reports the broadcast information of the second device and the user identifier of the target user to the network side after the broadcast information of the second device is detected, so as to confirm whether the target user falls within the preset distance from the first device, thereby improving precision of discovering a short-distance user, which solves a problem in the prior art in which precision of discovering a short-distance user cannot be ensured by using a cell ID.

Figure 21:
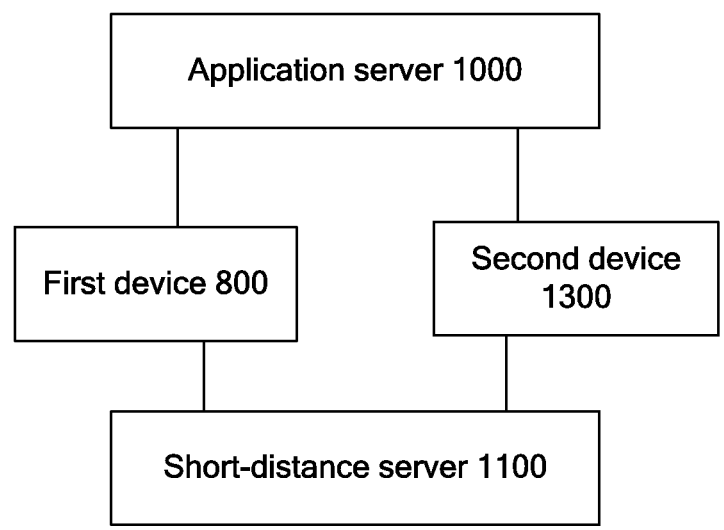
FIG. 21 is a schematic diagram of another device discovery system according to an embodiment of the present invention.

Referring to FIG. 21, an embodiment further provides a device discovery system, where the system includes the device discovery apparatus 800 described above, the application server 1000 described above, the short-distance server 1100 described above, and the device discovery apparatus 1300 described above.

Beneficial effects of this embodiment are: A short-distance server receives broadcast information, which is detected by a first device and sent by an application server, of a second device; the short-distance server queries, according to the broadcast information of the second device, a device identification of the second device, and if the short-distance server finds the device identification of the second device, returns the device identification of the second device to the application server, so that the application server queries, according to the device identification of the second device, the identifier of the user that logs in to the second device, and determines whether the identifier of the user that logs in to the second device is the user identifier of the target user, and returns a result of the determining to the first device, and the first device can confirm, according to the result of the determining, whether a device to which the target user logs in falls within a preset distance from the first device.

Because the first device can monitor broadcast information of another device within the preset distance, the first device sends, after detecting the broadcast information of the another device, the detected broadcast information and the user identifier of the target user to the application server, so that the application server obtains the device identification of the second device from the short-distance server according to the broadcast information, so as to confirm whether the target user falls within the preset distance from the first device. This improves precision of short-distance user discovery, and solves a problem in the prior art in which precision of short-distance user discovery cannot be ensured by using a cell ID.

The device discovery apparatus, application server, short-distance server, and system provided by the embodiments specifically belong to a same concept as the method embodiments, and reference may be made to the method embodiments for specific implementation processes thereof, which are not described repeatedly herein.

It should be noted that in the foregoing device discovery apparatus, application server, short-distance server, and system embodiments, modules included are divided according to functional logic, but are not limited to the forgoing division as long as corresponding functions are implemented. In addition, specific names of the functional modules are only for differentiating therebetween and are not used to limit the protection scope of the present invention.

In addition, a person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A device discovery method, wherein the method comprises:

enabling, by a first device, a device-to-device (D2D) monitoring and broadcasting function;

detecting, by the first device, broadcast information of a second device;

after the detecting, reporting the broadcast information of the second device and a user identifier of a target user to a network side, wherein the target user is a user that has to log-in to the second device so that the first device performs D2D communication with the second device only when the second device is located within a preset distance from the first device;

requesting the network side to obtain, according to the broadcast information of the second device, an identifier of a user that logs-in to the second device, and to determine whether the identifier of the user that logs-in to the second device is the user identifier of the target user;

receiving, by the first device, a result of the determining returned by the network side;

confirming, by the first device according to the result of the determining, whether a device to which the target user logs-in is the second device; and performing, by the first device, the D2D communication with the confirmed second device to which the target user logged-in.

2. The method according to claim 1, wherein, before enabling the D2D monitoring and broadcasting function, the method further comprises:

obtaining, by the first device, broadcast information of the first device; and after the first device enables the D2D monitoring and broadcasting function, broadcasting, by the first device, the broadcast information of the first device, so that another device except the first device can discover the first device according to the broadcast information of the first device.

3. The method according to claim 2, wherein obtaining the broadcast information of the first device comprises:

initiating, by the first device, a device discovery service request to a mobility management entity MME to which the first device belongs, so as to trigger the MME to obtain the broadcast information of the first device from a short-distance server; and receiving, by the first device, the broadcast information of the first device returned by the MME.

4. The method according to claim 2, wherein obtaining the broadcast information of the first device comprises:

initiating, by the first device, a registration request to a short-distance server, so as to trigger the short-distance server to assign the broadcast information to the first device; and receiving, by the first device, the broadcast information of the first device returned by the short-distance server.

5. The method according to claim 1, wherein the network side comprises an application server and a short-distance server;

wherein communication can be performed between the application server and the short-distance server; and wherein reporting the broadcast information of the second device and a user identifier of a target user to a network side comprises sending, by the first device, the broadcast information of the second device and the user identifier of the target user to the application server, so as to trigger the application server to obtain locally or obtain by using the short-distance server, according to the broadcast information of the second device, the identifier of the user that logs in to the second device, and determine whether the identifier of the user that logs in to the second device is the user identifier of the target user.

6. The method according to claim 1, wherein the network side comprises an application server and a short-distance server, and communication cannot be performed between the application server and the short-distance server;

wherein reporting the broadcast information of the second device and a user identifier of a target user to a network side comprises:

sending, by the first device, the broadcast information of the second device to the short-distance server, so as to trigger the short-distance server to query a device identification of the second device;

receiving, by the first device, the device identification of the second device returned by the short-distance server; and sending, by the first device, the device identification of the second device and the user identifier of the target user to the application server, so that the application server queries, according to the identification of the second device, the identifier of the user that logs in to the second device, and determines whether the identifier of the user that logs in to the second device is the user identifier of the target user.

7. A device discovery method, wherein the method comprises:

receiving, by an application server, broadcast information of a second device and a user identifier of a target user that are sent by a first device, wherein the target user is a user that has to log-in to the second device so that the first device performs device-to-device (D2D) communication with the second device only when the second device is located within a preset distance from the first device;

obtaining, by the application server according to the broadcast information of the second device, an identifier of a user that logs in to the second device;

if the application server obtains the identifier of the user that logs in to the second device, determining whether the identifier of the user that logs in to the second device is the user identifier of the target user; and returning, by the application server, a result of the determining to the first device, wherein the result of the determining is used by the first device to confirm, whether a device to which the target user logs in is the second device and falls within the preset distance from the first device, so that the first device performs D2D communication with the confirmed second device to which the target user logged-in.

8. The method according to claim 7, wherein obtaining the identifier of a user that logs in to the second device comprises:

querying locally, by the application server, the identifier, which is corresponding to the broadcast information of the second device, of the user that logs in to the second device, and obtaining the identifier of the user that logs in to the second device; or requesting, by the application server according to the broadcast information of the second device, a device identification of the second device from a short-distance server; receiving and storing, by the application server, the device identification of the second device returned by the short-distance server; and querying, according to the device identification of the second device, the identifier of the user that logs in to the second device, and obtaining the identifier of the user that logs in to the second device.

9. A device discovery apparatus, wherein the apparatus comprises:

a processor; and a computer-readable storage medium storing a program to be executed by the processor, the program including instructions for:

obtaining broadcast information of the apparatus from a network side;

enabling a device-to-device (D2D) monitoring and broadcasting function;

after enabling the D2D monitoring and broadcasting function, if broadcast information of a second device is detected, reporting the broadcast information of the second device and a user identifier of a target user to the network side, requesting the network side to obtain, according to the broadcast information of the second device, an identifier of a user that logs in to the second device, and determining whether the identifier of the user that logs in to the second device is the user identifier of the target user, wherein the target user is a user that has to log-in to the second device so that the device discovery apparatus performs D2D communication with the second device only when the second device is located within a preset distance from the apparatus; and after reporting the broadcast information of the second device and the user identifier of the target user, receiving a result of the determining returned by the network side, and confirming, according to the result of the determining, whether a device to which the target user logs in to is the second device and falls within a preset distance from the apparatus; and performing D2D communication with the confirmed second device to which the target user logged-in.

10. The apparatus according to claim 9, wherein the program further includes instructions for:

after enabling the D2D monitoring and broadcasting function, broadcasting the obtained broadcast information, so that the apparatus can be discovered by another device except the apparatus according to the broadcast information.

11. The apparatus according to claim 10, wherein:

the program further includes instructions for: initiating a device discovery service request to a mobility management entity (MME), so as to trigger the MME to obtain the broadcast information of the apparatus from a short-distance server; and the apparatus further comprises a receiver, configured to, after the device discovery service request is initiated, receive the broadcast information of the apparatus returned by the MME.

12. The apparatus according to claim 10, wherein:

the program further includes instructions for: initiating a registration request to a short-distance server, so as to trigger the short-distance server to assign the broadcast information to the apparatus; and the apparatus further comprises a receiver, configured to, after the registration request is initiated, receive the broadcast information of the apparatus returned by the short-distance server.

13. The apparatus according to claim 9, further comprising:

a transmitter, configured to, when the network side comprises an application server and a short-distance server, and communication can be performed between the application server and the short-distance server, to send the broadcast information of the second device and the user identifier of the target user that is detected to the application server, so as to trigger the application server to obtain locally or obtain by using the short-distance server, according to the broadcast information of the second device, the identifier of the user that logs in to the second device, and to determine whether the identifier of the user that logs in to the second device is the user identifier of the target user.

14. The apparatus according to claim 9, further comprising a transmitter configured to, when the network side comprises an application server and a short-distance server, and communication cannot be performed between the application server and the short-distance server, send the broadcast information of the second device to the short-distance server, so as to trigger the short-distance server to query a device identification of the second device;

wherein the apparatus further comprises a receiver, configured to receive the device identification of the second device returned by the short-distance server; and wherein the transmitter is further configured to send the device identification of the second device and the user identifier of the target user to the application server, so that the application server queries, according to the device identification of the second device, the identifier of the user that logs in to the second device, and determines whether the identifier of the user that logs in to the second device is the user identifier of the target user.

15. An application server, wherein the server comprises:

a receiver, configured to send broadcast information of a second device and a user identifier of a target user that are sent by a first device, wherein the target user is a user that has to log-in to the second device so that the first device performs device-to-device (D2D) communication with the second device only when the second device is located within a preset distance from the first device;

a processor; and a computer-readable storage medium storing a program to be executed by the processor, the program including instructions for:

obtaining, according to the broadcast information, which is received by the receiver, of the second device, an identifier of a user that logs in to the second device, and if the identifier of the user that logs in to the second device is obtained, determining whether the identifier of the user that logs in to the second device is the user identifier, which is received by the receiver, of the target user; and a transmitter, configured to return a result of the determining to the first device, wherein the result of the determining is used by the first device to confirm, whether a device to which the target user logs in is the second device and falls within a preset distance from the first device, so that the first device performs D2D communication with the confirmed second device to which the target user logged-in.

16. The server according to claim 15, wherein the program further includes instructions for:

querying locally the identifier, which is corresponding to the broadcast information of the second device, of the user that logs in to the second device, and obtaining the identifier of the user that logs in to the second device; or requesting, according to the broadcast information of the second device, a device identification of the second device from a short-distance server; receiving and storing the device identification of the second device returned by the short-distance server, and querying, according to the device identification of the second device, the identifier of the user that logs in to the second device, and obtaining the identifier of the user that logs in to the second device.

17. A short-distance server, wherein the server comprises:

a receiver, configured to receive broadcast information, which is detected by a first device and sent by the first device, of a second device;

a processor; and a computer-readable storage medium storing a program to be executed by the processor, the program including instructions for:

querying a device identification of the second device according to the broadcast information, which is received by the receiver, of the second device, and if the device identification of the second device is found, return the device identification of the second device to the first device, so that the first device sends the device identification of the second device and a user identifier of a target user to an application server, the application server queries, according to the device identification of the second device, an identifier of a user that logs in to the second device, determines whether the identifier of the user that logs in to the second device is the user identifier of the target user, and returns a result of the determining to the first device, wherein the result of the determining is used by the first device can confirm, whether a device to which the target user logs in is the second device and falls within a preset distance from the first device, so that the first device performs D2D communication with the confirmed second device to which the target user logged-in;

wherein the target user is a user that has to log-in to the second device so that the first device performs device-to-device (D2D) communication with the second device only when the second device is located within a preset distance from the first device.

18. The server according to claim 17, wherein:

the receiver is further configured to: before receiving the broadcast information, which is detected by the first device and sent by the first device, of the second device, receive a request initiated by a mobility management entity MME to which the first device belongs for obtaining broadcast information of the first device; and wherein the program further includes instructions for assigning the broadcast information to the first device according to the request initiated by the MME, and returning the broadcast information to the first device by using the MME.

19. The server according to claim 18, wherein:

the receiver is further configured to: before receiving the broadcast information, which is detected by the first device and sent by the first device, of the second device, receive a registration request initiated by the first device; and the program further includes instructions for performing authorization on the first device according to the request initiated by the first device, and assigning broadcast information to the first device after the authorization succeeds.

20. The server according to claim 19, wherein the program further includes instructions for:

performing authorization locally on the first device according to the request initiated by the first device; or querying, according to the request initiated by the first device, subscription information of the first device from a home subscription server (HSS) to which the first device belongs, and performing authorization on the first device according to the subscription information of the first device returned by the HSS.

* * * * *